Aug. 23, 1960     P. D. LANCO     2,949,812
MEANS FOR PRODUCING COLOR POSITIVES IN TRUE NATURAL COLORS
Filed Nov. 4, 1957     3 Sheets-Sheet 1
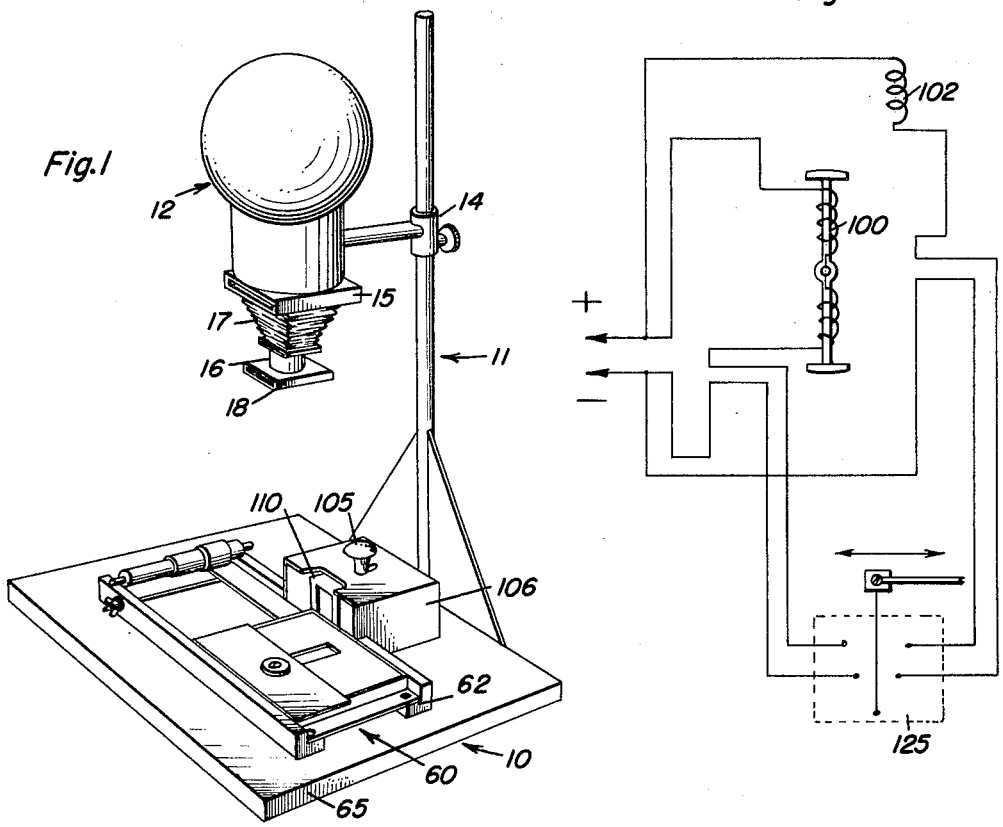
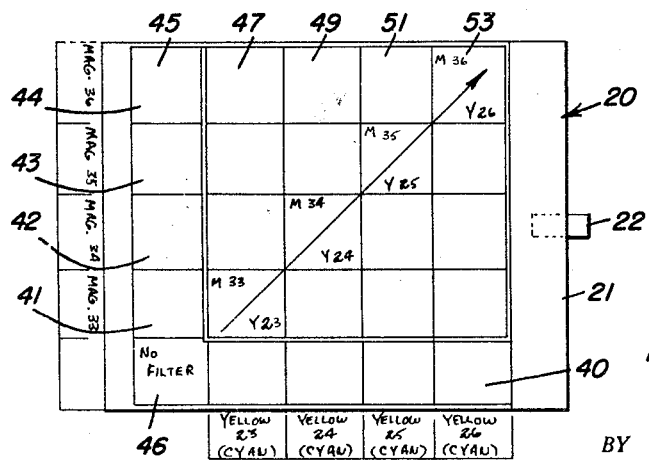
Philip D. Lanco
INVENTOR.

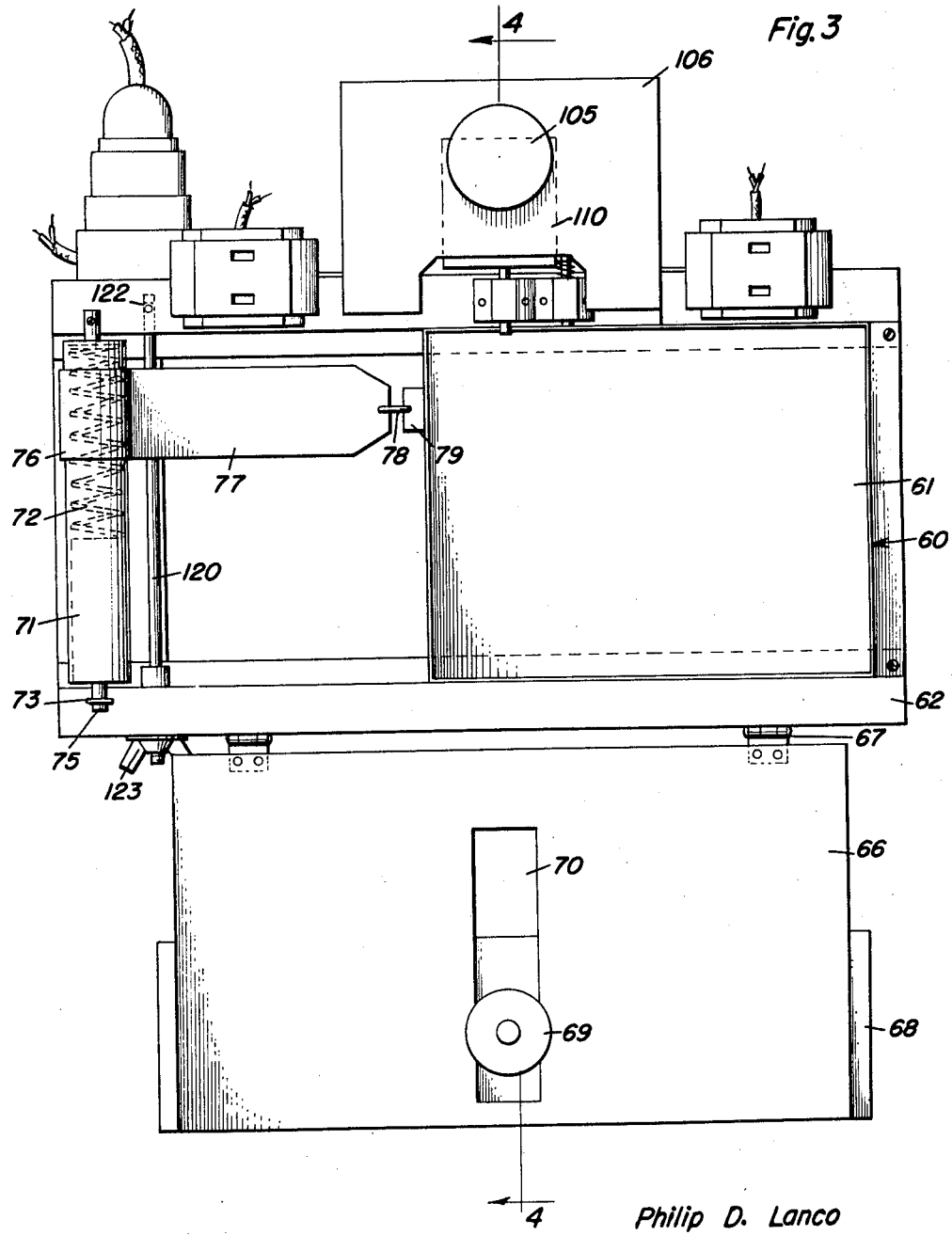

Aug. 23, 1960 P. D. LANCO 2,949,812
MEANS FOR PRODUCING COLOR POSITIVES IN TRUE NATURAL COLORS
Filed Nov. 4, 1957 3 Sheets-Sheet 3
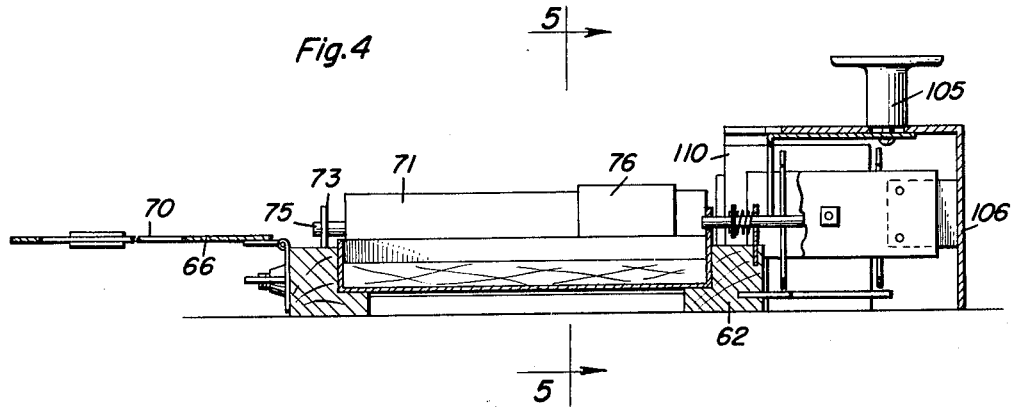
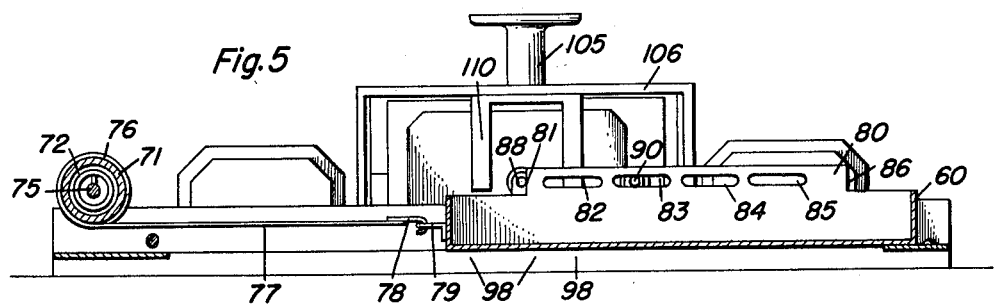
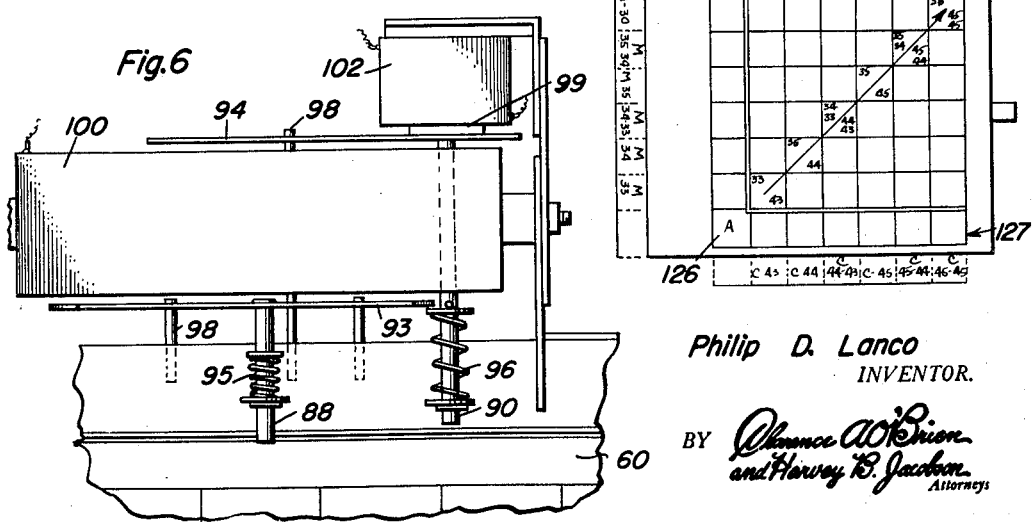
Philip D. Lanco
INVENTOR.

United States Patent Office 2,949,812
Patented Aug. 23, 1960

2,949,812

MEANS FOR PRODUCING COLOR POSITIVES IN TRUE NATURAL COLORS

Philip D. Lanco, R.D. 1, Bentleyville, Pa.

Filed Nov. 4, 1957, Ser. No. 694,182

9 Claims. (Cl. 88—24)

This invention relates to color photography and it has for its main object to provide a method and means for producing color positives in true "natural" colors whether the said color positives are made directly in the camera by means of sunlight or artifical light or whether they are produced as prints from a color negative by means of a printing lamp.

In connection with the making of color positives of true colors, certain difficulties are experienced in connection with the obtaining of true or natural colors. When the positive is made from a negative, there are at least two different sources of errors not connected with the positive itself which produce deviation—and sometimes considerable deviation—from the true or natural colors in addition to any error which may have been introduced by the producing or treating of the positive material itself. These errors may, on one hand, be inherent in the color negative from which the positive is made, being for instance due to incorrect selection of the filter used during the exposure of the negative or to incorrect treating of the negative after exposure.

A second source of error resides in the light with which the positive is made, whether this light emanates from a source of light furnishing the light for making the positive in the camera or whether this light is the light of a printing lamp used during the printing of a positive picture from a negative. Obviously, more or less colored light produces a positive with some over accentuated and some over attenuated colors.

It is therefore a special object of the invention to provide a method and means for producing the "natural" colors of the color positive, also in the event that either the light used for exposing or for printing a color positive or the color negative itself contains color errors so that by themselves they would not be well adapted to the production of true natural color in a color positive.

A further object of the invention consists in a method and means permitting to obtain without color error by means of a simple indication process the correct filter data for correcting and for determining the filters which will correct the color errors found in the sources determining the color of the color positives, so that the latter shows "natural" colors, even though the color negative from which the color positive is printed was faulty with respect to color and even in those cases in which the color temperature of the light by means of which the positive is made was not well adapted to produce color pictures in natural colors from the negative with which it cooperates.

Essentially, the invention consists in providing a test method and test means for producing color positives divided into test areas by means of a plurality of basic test filter assemblies with monochromatic and combined filters of different gradation so arranged that their position in the assembly indicates the type of filter or filters necessary for correct color production or the absence of a filter. Thus, the test area, showing natural colors with one of the filters of the assembly, indicates the simple monochromatic filter or the combined filters which should be used during the following operation. This indication is provided by a filter sheet or plate showing a plurality of monochromatic and combined filters in systematic order which may be used simultaneously or successively. The location of any filter producing the desired result of giving true colors during a test print with the filter immediately indicates to the operator whether a filter must be used, whether the corrective filter is monochromatic or is a combination of monochromatic filters, and what is the gradation of the filter or filters to be used on a predetermined standard gradation scale. Further, the method according to the invention always indicates how by the use of two filters and two filters only the correction may produce natural colors.

The method according to the invention, as will be clear, is applicable to the production of a color positive in the camera as well as to the printing of a color positive from a negative. When printing from a negative, the method most widely used, as well known, involves using color negatives, the colors of which are reversed and are complementary to the true colors. The method according to the invention may be applied to all operations producing a positive without change. Basic primary filters may be added to the printing light in order to correct color errors. When printing from positive color transparencies complementary color filters are added to the light for correction purposes.

For the following description, it is essentially assumed that color positives are produced by printing from transparent color negatives using the color reversal process. However, as will be clear from the above, the method is the same whether the color positive is made in the camera or is made from a transparent negative in true colors (transparent color positive) or is made from a transparent negative with reversed (complementary) colors and the description of a single example is deemed to be sufficient to explain the method.

According to the invention, a special device may be provided for rapidly making three test prints.

While simultaneous exposure of the entire filter assemblies may be preferable for certain tests and indeed is always performed if tests are made within a camera, it is preferable, where a plurality of test prints in a printing apparatus is made, to use a testing device permitting equal exposure in rapid succession of certain limited areas or fields which are exposed through a small number of filters covering them. Such a small exposed test area may be one in which either only monochromatic filters of different gradation are arranged or in which combined filters are used, one monochromatic filter being the same throughout while the other monochromatic filter is of varying gradation. This arrangement facilitates greatly the determination of the filter or filter combination producing true natural colors.

To produce such limited areas preferably in the shape of elongated strips when printing from negatives, a test exposure device is used in connection with a standard printing apparatus which, by means of an electromagnetically operated device with retractable, alternatively operated stops, advances a test print carrying slide in a step-by-step manner over definite distances during equal times, thus bringing a limited, preferably strip-shaped area of the color print and filter into an exposed area of the desired shape in rapid succession. The color print thus produced by rapidly succeeding partial exposures will show various areas with different color shades, among which that area which shows the best approximation to natural colors may be selected, the corrective filter or filters producing this approximation to natural colors being determined by the position of the area showing such approximation.

The operation of this device is preferably automatic to such an extent that the manipulation is reduced to a minimum, while accuracy is high.

Further features and objects of the invention will be apparent from the following detailed description. The invention is described in detail with reference to the accompanying drawing illustrating one embodiment of the invention. It is, however, to be understood that the drawings are purely diagrammatical and that they intend solely to form an aid in explaining the principle of the invention and the best mode of applying the principle. Special modifications of the apparatus illustrated diagrammatically will be obvious to those skilled in this art and therefore do not necessarily constitute a departure from the principles of the invention.

In the drawings:

Figure 1 is a perspective diagrammatic view of a printer by means of which prints in general and test prints according to the invention may be made.

Figure 2 is a diagram of one of the test filters of which a number is used.

Figure 3 is a plan view of an apparatus by means of which successive exposures of equal length of a number of strips each containing a series of filters may be obtained.

Figure 4 is a diagrammatic sectional elevational view of the apparatus shown in Fig. 3, the section being taken along line 4—4 of Figure 3.

Figure 5 is a sectional elevational view of the same apparatus, the section being taken along line 5—5 of Figure 4.

Figure 6 is a plan view of a detail of the apparatus.

Figure 7 is a diagram of another filter with a larger number of gradations.

Figure 8 is a diagram of the electrical connections.

The method according to the invention may be applied to color images or color positives made by a camera or in any other way without using any negative; it is, however, explained with reference to the printing of positives from negatives in a printing apparatus on account of the additional difficulties which are connected with this type of work. Such an apparatus is shown in Figure 1 of the drawings. It comprises the conventional easel or board 10, a standard 11, and a lamp housing 12, containing the printing lamp, which is held on the standard by means of the adjustable fixation means 14. The printing lamp within the housing 12 has a predetermined color temperature, determined practically by the manufacturer as it depends on the degree to which the filament is heated which, in its turn, is dependent on the voltage which is applied. The color temperature may therefore be somewhat adjusted by the operator by adjusting the voltage, but is essentially to be regarded as a fixed one. Regularly the color temperature of the printing light is adjusted to a certain value, for instance, to 5.400° K. which is supposed to produce pure white light. The practical range for printing varies between 2900° K. and 9500° K.

Attached to the lamp housing is a slotted frame 15 for the negative connected by the conventional adjustable bellows 17 to the lens holder 16. The lens holder carries the filter frame 18 into which the correcting filter or correcting filters are inserted.

The correcting filters inserted into frame 18 serve the purpose of producing natural colors on the printed positive by means of the source of light in the housing 12, even in the event of a deviation of the negative from the true color and even in the event that the color temperature of the lamp is not properly fitted or adjusted to the colors of the negative.

The correct selection of correcting filters is made by means of test prints using filter grids, such as are illustrated diagrammatically in Figure 2.

For tricolor printing three such filter grids are in use. Each filter grid 20 comprises a base plate 21 of glass or any other transparent material on which the filters are mounted. Each plate is provided with a handle 22 for easy manipulation.

The filter grid may cover the positive color picture to be made or may only cover a portion thereof. It is divided into squares, each filled by a filter of different strength or gradation, arranged in intersecting rows and columns. Each filter grid preferably contains filters of two different colors. Filters of one color and of the same strength or gradation are arranged in the same row; the other color filters having the same strength or gradation are arranged in a column. When proceeding from column to column in a row containing filters of one color only, or when proceeding from row to row in a column containing filters of the other color, the filter value changes in steps which correspond to a standard gradation.

It will be noted in Figure 2 that the filter values increase with their distance from the square or field 46 in the left lower corner of the diagram which represents a zero value and has no filter.

It will further be noted that column 45 and row 40 contain solely monochromatic filters of increasing filter values, while within the space enclosed by double lines combined filters for two colors are mounted.

All columns 47 through 53 with combined filters hold filters of one color of the same gradation. Likewise all rows 41 through 44 hold each a filter of the second color of the same gradation value; when proceeding along a row or along a column, therefore, the gradation of the filter for one color changes, while that for the other color remains constant. It will be noted that if standard values are chosen for both colors, the filters along the diagonal marked by a line with an arrow are of equal strength in both colors.

In the example illustrated in Figure 2, the two colors are magenta and yellow and the gradation values are marked according to the standard scale for filters, thus the yellow color increases along row 40 from 23 to 26, while the magenta color increases from row 41 to row 44 from magenta 33 to magenta 36. It is thus seen that outside of the double line the monochromatic filters increase in strength for the two colors magenta and yellow with their distance from the filterless square 46 and that the filter value is determined by the place within the column or row; within the double line two superposed monochromatic filters combine, with the filter strength of filters of both colors being likewise determined by the position of the filter within the square.

Three such filter grids are necessary for test prints when tricolor prints are made, this being indicated in the diagram by the inscription "cyan" below the color inscription. This inscription in parenthesis indicates that yellow filters, for instance, may be combined not only with the magenta filter as indicated in the diagram, but may also be combined with cyan colored filters, and that likewise the magenta filter is not only combinable with the yellow filter, but also may be combined with the cyan filter, thus obtaining the three combinations magenta-cyan, magenta-yellow and yellow-cyan which are necessary.

The filter grid is used by placing it directly on and in contact with the multi-layer color positive with a paper or film strip backing.

As explained above, in order to obtain true, natural colors on the positive, it is necessary to correct different color errors. Such color errors are due mainly to the sources which produce the colors on the positive print. One of these color errors may be due to the type of light used for making the positive either in a camera or in a printing apparatus, such as shown in Figure 1. The source of light may not have the correct color temperature in accordance with the type of negative to be used or in accordance with the material used in connection with the making of positives, and the type of light which is available may therefore lead to the accentuating of certain colors and to the attenuating of others.

This color error may be corrected by means of filters, raising or lowering the color temperature of the rays impinging upon the color positive to be made by them.

In order to determine whether a correction of the color temperature is necessary, two of the three filter grids may be used for making a test print, one of said filters raising and the other lowering the color temperature of the ray.

To facilitate such a test, a double cassette may be used, each side of the cassette containing the emulsion carrier on which the positive is to be made, together with one of the two above mentioned filter grids for raising and for lowering color temperature, respectively. To make test prints, the positives are exposed through the filter grids and developed. The 25 squares of each of the filter grids will indicate whether the color temperature has to be raised or to be lowered and the correct filters for such lowering or raising are selected by inspecting the prints and selecting the square in which the natural colors are most nearly reproduced. The location of the square immediately indicates the filter value for the filters to raise or lower the color temperature. If the color temperature of the light is correct, the best print will be formed in the zero square 46.

The cassette may also be used directly in a camera in the event that a positive is to be made in said camera. The emulsion carrier with the multi-layer emulsion and the filter grid on top of it is placed into the cassette; it may be directly inserted into the camera and exposed to the light with which the object is to be illuminated when photographed in natural colors, after taking accurate exposure measurements through a yellow filter which is used afterwards also during exposure of the picture to be made.

In most cases, it is preferable to make at least two exposures with the two filter grids in the double cassettes, especially if a new type of positive material is to be tested.

To understand clearly the process of raising or lowering the color temperature of the printing light, the following example may be given.

Let it be assumed that the light source used for printing a negative which has been inserted into the printing apparatus has a color temperature of 5400° K., which source produces a light called pure white light, which, however, when printing on a certain type of material, may produce a yellowish color in the print. This indicates that the light required for this particular positive should be of a higher color temperature and should therefore be more bluish. Then the negative is exposed through the magenta-cyan filter grid which produces a raising of the color temperature of the printing rays corresponding to a temperature between 5400° K. and 9500° K. This raising of the temperature is produced by raising the content in blue and other highly actinic rays.

The square with best results on the positive which has been obtained and developed indicates which filter has to be selected for raising the color temperature of the printing light.

A similar procedure is applied for lowering the color temperature, using, for instance, the magenta-yellow filter grid which produces a range of the color temperatures of the printing rays from 5400° K. to about 2900° K.

This correction of the color temperature of the source of the rays by means of filters may also be used for the correction of certain errors which occur in printing from a negative which accidentally, either through the use of the wrong filter or on account of some error in the treating of the negative, shows an over-all error in color; the negative may, for instance, be yellowish all over or the like, a mistake which sometimes happens in color photography. A change of the color temperature of the printing rays may correct such an error. Likewise the correction of color temperature by means of filters may be necessary in order to correct certain color peculiarities of the positive material on which the print is made.

As stated above, one square (46) in each filter grid is without any filter. If this square should show the best rendition of the colors of the print, this indicates clearly that the color temperature of the printing light is the correct color temperature for making the print from the negative inserted into the printing apparatus.

Preferably, the printing device permits to insert two sets of filters. One of the filters merely modifies the color temperature or spectral composition of the printing light. The other filter opening is provided for inserting into it monochromatic or combined filters which are necessary for the printing process proper.

It may be mentioned here that errors in selecting the proper filter grids for raising or lowering color temperatures will manifest themselves automatically. If the operator, for instance, should make a test print and select a cyan-magenta filter grid instead of the yellow-magenta grid which may be assumed to be the correct one, this would manifest itself immediately in the fact that the cyan color would predominate in all squares, and that it will especially dominate in the square 46 which has no filter, and which will therefore also show a cyan color, thus indicating clearly that the color temperature is too high and needs lowering. With two filter grids in the two cassettes, the necessity of a color temperature correction either on account of the predominance of certain light rays in the source of light or on account of the negative or on account of peculiarities in the positive material will always be plainly indicated in the test print.

To correct color errors when making color positives by printing from negatives, a closely similar method is used according to which three test prints, each with one of the filter grids on top of the color positive, are made. Three test prints are of course only necessary if the two first tests do not shown completely satisfactory results.

While filter grids of the type illustrated in Figure 2 are normally used, filters with a finer gradation may sometimes be more desirable. Figure 7 shows a filter grid 127 with a color filter gradation in half degrees of the standard color filter scale. The arrangement is identical in other respects to that illustrated in Figure 2 and the horizontal and vertical distance from the zero or no-filter square 126 indicates clearly the type of filter to be used.

It will be noted that the number of compensating filters to be used during the final printing with this method is always reduced to one or two, which is a major advantage over the present methods.

In the event that prints are made from color negatives by projection, as indicated, for instance, in Figure 1, it is preferable to operate with successive, but absolutely equal exposures of sections of the print, each section preferably comprising a series of filters of one color having the same gradation. Sectional exposure is preferable in order to be able to utilize the full brightness of the light; in other words, the largest aperture of the lens may thus be used for printing which would not be admissible during the final printing operation in the average case. This allows maximum illumination of the transparency.

The device for producing such successive sectional exposures of the print which are absolutely equal and which are covered by the filter grid during the tests and printing is illustrated in Figure 1 and in Figures 3 to 6.

As seen in these figures, the emulsion carrier for the positive picture is placed on a slide frame 60 which is placed on the board 65 of the easel. The slide frame may reciprocate within a base frame 62 provided with angular tracks. In this slide frame, the print holder plate or board 61 may be held, on top of which the printing material and the filter grid may be placed.

The fixed frame 62 essentially comprises the track forming members which have been joined in a somewhat adjustable manner. They may be hinged on one side to the plate while on the other side they are joined by means of a bolt 120 with a threaded end and a wing nut 123 which is anchored at 122 in one of the tracks while passing through the other track. This permits an adjustment of the frame 62 and especially of the tracks.

A cover 66 is preferably, by means of hinges 67, hinged to the frame 62 so that it can be turned through an angle of at least 180° and can either be placed on top of the printing material and filter grid, or can be completely turned over, as shown in Figure 3, so as to free the frame 62, permitting to place the printing material and filter grid on it and to remove it. The cover 67 has a slot 70 located exactly in the center of the cover plate. This slot is preferably of the width of a filter grid square and of the length of the filter grid. Thus, a strip equal in width to one column or to one row of the filter grid is exposed through the slot 70 while the remainder of the filter grid and of the printing material remains covered.

In view of the fact that the printing material may have different dimensions and that the filter grids, on account of this fact, may also be of different dimensions, means are preferably provided to cover those parts of the slot which are not used. This means may consist of a plate 68 provided in the center with a bolt carrying a nut 69 at one end and a disk at the other end, by means of which the said covering plate 68 may be fixed on the cover 66 in the slotted portion in order to cover that part of the slot which is not used.

As will be noted the cover 66 which is hinged to the fixed frame 62 remains stationary. In order to move the slide frame 60 below the slot, a roller 71 with an in-built spring 72 is preferably arranged near the end of the frame 62 held, by means of a projecting axle 75, in bearing brackets 73. The spring 72 may be fixed to the axle on one side and on the roller on the other side, and when wound exercises a constant force on the roller 71, rotating the same. The roller 71 carries a drum 76 on which a belt 77 is wound. The belt may simply consist of a length of 35 mm. film, or may consist of some other material which coils easily and tightly around the drum 76. The end of the belt 77 is provided with a hook 78 for engaging a suitable opening in the bracket 79 projecting from and attached to the slide frame 60.

The slide frame 60, moreover, has a projecting rear wall extension 80 provided with exactly cut edges 81 and 86 and exactly spaced slots 82, 83, 84, 85, which serve to limit and regulate the step-by-step movement of the slide frame. The advance movement of the slide frame 60 is regulated by the two axially movable shafts 88 and 90 which form stops for the slide cooperating with the said edges 81 and 86 and slots 82–85.

Each shaft 88, 90 is attached to an armature plate 93, 94, respectively; each shaft is, moreover, provided with a spring 95, 96, respectively. The spring 95 is applied against a disk on shaft 88 and against a bracket on the frame and urges the shaft 88 towards the slide 60, while spring 96 similarly pressing against a disk on the shaft and a bracket on the frame urges normally the shaft 90 away from the slide 60.

To operate the armature plates 93, 94, thereby operating the shafts attached to them, relays 100 and 102 are arranged.

The shaft 90 which must pass through or close to the relay winding of relay 100 is preferably made of non-magnetic material. The plates 93 and 94 which are carried by the shaft are preferably additionally supported by means of guide rods 98 which are suitably held on the frame 62.

The plate 94 is provided with another armature 99 which may be attracted by a further relay 102.

It will be seen in Figure 6 that normally plate 93 attached to the shaft 88 is urged away from the relay by the spring 95, while plate 94 is urged away from the relay by the shaft 90 which is under the pressure of spring 96. Shaft 88 in the original position of the slide frame 60 acts as a stop behind edge 81 of the extension 80 of the rear wall projection.

To make the test prints from a negative to be inserted into the frame 15 of the printing apparatus, the slide frame is moved into printing position, the emulsion carrier for the color positive with one of the filter grids on top is placed on the plate holder of the slide frame 60, and the cover 66 is moved over it so that only one column or row of the filter grid is exposed through the slot. Preferably the filter grid has been so placed that one of its columns or rows is coincident with the slot. When the switch for the printing lamp is thrown, exposure starts through the slot; the switch will also operate the relays in correct sequence. Upon energization of relay 100, the armature plates 93 and 94 are moved towards the relay and the movement of plate 93 withdraws the end of the shaft 88 forming the stop behind the edge 81, simultaneously pushing the end of shaft 90 into the midst of slot 83. The spring drum roller thereupon moves the slide frame until shaft 90 acts as a stop, the distance being exactly one-half of the distance through which the slide 60 has to be moved.

The other half of the motion is performed upon energization of the relay 102 and deenergization of the relay 100. The deenergization of relay 100 releases the armature plates and the shaft 88 is again drawn forwardly entering slot 82. Simultaneously, the shaft 90 is withdrawn by the attraction of armature plate 99 and relay 102. The slide then may move until shaft 88 stops it at the end of the slot.

The automatic switch 125 is only indicated diagrammatically. It alternatively energizes relays 100 and 102 in rapid succession for the required number of times, thus producing exposure of strips advanced below slot 70 which are coincident with one of the columns or rows of a filter grid.

For resetting the slide frame, a resetting knob 105 is provided mounted in a slot of the housing 106 which encloses the reset device and the relay 100. The reset knob 105 is connected with the forked member 110, the prongs of which are arranged in front of the armature plate 93. When the reset knob 105 is moved rearwardly, the forked member 110 moves the armature plate 93, withdrawing the shaft 88 and permitting the outward movement of the slide frame 60. The shaft 90 and armature plate 94 are automatically reset.

After this operation has been terminated, the paper or film on which the positive print has been made is developed and examined. For a complete examination, it is necessary to make three test prints, each one with a different filter grid. When all three test prints have been made, they are examined and the square showing the best rendition of the colors is determined, which indicates immediately by its position the filter or filters which have to be inserted for the compensation of the various errors.

In general, the present invention may be regarded as a means for mixing the basic spectral components of the printing light in such a manner that they produce true colors. These components as such are not visible to the human eye. The adjustments such as made at present to obtain a satisfactory print in gray will not be adequate, because light which is properly filtered for one transparency in order to produce the desired true colors is not always suitable for another transparency. This must be determined by conducting the tests first before regular printing. The determination as seen from the above description is quick and more or less automatic when using the filter grids because the location of the square showing as nearly as possible true or natural colors immediately indicates the filter or filters which have to be used during printing.

It will be clear that non-essential changes may be made in the method and in the device as described without in any way departing from the essence of the invention as defined in the annexed claims.

What is claimed as new is as follows:

1. A device for making test prints comprising a filter assembly having a filter grid, including filters in two colors divided into fields arranged in intersecting rows, one of the rows in one plane containing filters of a single color having different gradations, while one of the rows in the other plane contains filters of another single color having different gradations, the other rows containing two color filters, each row thereof having one filter for one color which is the same in value and one filter of a second color of a variable gradation varying with the location of the filter within the row, said filter assembly including an opaque web means in confronting relationship with a surface of said filter grid, said web means having an opening of a dimension equal to one row of said filter grid and means for moving said filter grid in step-by-step movement bringing successive filter rows in juxtaposition with said opening.

2. A device for making test prints comprising a frame with track guides, a movable slide, adapted to move on said track guides, said slide having a filter grid, including filters in two colors divided into fields arranged in intersecting rows, one of the rows in one plane containing filters of a single color having difffferent gradations, while one of the rows in the other plane contains filters of another single color having different gradations, the other rows containing two color filters, each row thereof having one filter for one color which is the same in value and one filter of a second color of a variable gradation varying with the location of the filter within the row, means on said slide for carrying photosensitive sheet material in confronting relationship with one side of the filter grid, a cover on said frame on the other side of the filter grid provided with a slot for admitting light from a light source, said slot having a width equal to one row of said filter grid, means for advancing the slide on said track guides in a step-by-step movement, and withdrawable stop means in operative relationship with said slide to prevent further movement thereof after advancing a distance equal to the width of the slot.

3. A device for making test prints as claimed in claim 1, wherein one field is without filters, said field being arranged at the intersection of the rows containing filters of a single color, said field being the reference point for the filter gradation.

4. A device for making color positives by means of test prints, as claimed in claim 1, wherein for a tricolor print three filter grids are provided each filter grid containing two of the three colors.

5. A device as claimed in claim 2, wherein the means for advancing the slide in a step-by-step movement include a spring operated device exercising a permanent pulling force on the said slide, and said stop means including a series of withdrawable stops cooperating with stopping means provided on the slide, means for withdrawing said stops alternatively in a predetermined sequence of operations of said withdrawable stops, withdrawal of one of the stops advancing the slide under the influence of the pulling force of the spring operated device until stopped by the other withdrawable stop engaging a stopping means on the slide, the slide thus advancing for equal distances upon operation of the means for withdrawing the stops.

6. A device as claimed in claim 2 wherein the means for advancing the slide in a step-by-step movement include a spring operated device exercising a permanent pulling force on the said slide, and said stop means including a series of withdrawable stops cooperating with stopping means provided on the slide, means for withdrawing said stops alternatively in a predetermined sequence of operations, said means including spring pressed withdrawable shafts carrying the stops, two armature plates, each fixedly attached to one of the withdrawable shafts, a spring urging one of said withdrawable shafts carrying a stop towards engagement with the stopping means on the slide, and another spring urging another withdrawable shaft carrying a stop away from the stopping means on the slide, a relay moving the armature plates in opposite directions, thus disengaging one of the withdrawable stops from a stopping means on the slide while moving the other withdrawable shaft with its stop into a position of engagement with the stopping means on the slide, a further armature fixedly mounted on the last named withdrawable shaft carrying a stop and a further relay attracting said last named armature when energized alternatively with the first named relay and disengaging the last named withdrawable stop from its engagement with the stopping means on the slide, withdrawal of one of the stops thus advancing the slide under the influence of the pulling force of the spring pressed device until stopped by the other withdrawable stop engaging a stopping means on the slide, the slide thus advancing through equal distances upon operation of the means for withdrawing the stops and switching means for alternatively energizing said relays.

7. A device as claimed in claim 2, wherein the means for advancing the slide in a step-by-step movement include a spring operated device exercising a permanent pulling force on the said slide, and said stop means including a series of withdrawable stops cooperating with stopping means provided on the slide, means for withdrawing said stops alternatively in a predetermined sequence of operations, said means including spring pressed withdrawable shafts carrying the stops, two armature plates, each fixedly attached to one of the withdrawable shafts, a spring urging one of said withdrawable shafts carrying a stop towards engagement with the stopping means on the slide, and another spring urging another withdrawable shaft, carrying a stop, away from the stopping means on the slide, a relay moving the armature plates in opposite directions, thus disengaging one of the withdrawable stops from a stopping means on the slide while moving the other withdrawable shaft with its stop into a position of engagement with the stopping means on the slide, a further armature fixedly mounted on the last named withdrawable shaft carrying a stop and a further relay attracting said last named armature when energized alternatively with the first named relay and disengaging the last named withdrawable stop from its engagement with the stopping means on the slide, said stopping means on the slide engaging a stop after it has performed one-half of its advance equal to the width of the slot, the withdrawal of the last named withdrawable shaft carrying the stop and the movement of the other shaft carrying a stop towards the slide under the influence of its spring producing a further movement of the slide equal to another half of its advance, thus moving the latter through a distance equal to the width of the slot.

8. A device as claimed in claim 2, wherein the means for advancing the slide in a step-by-step movement include a spring operated device exercising a permanent pulling force on the said slide, and said stop means including a series of withdrawable stops cooperating with stopping means provided on the slide, means for withdrawing said stops alternatively in a predetermined sequence of operations of said withdrawable stops, and in addition a resetting device, including a reset knob and a forked member attached to said knob, said forked member pressing on one of the armature plates so as to disengage the withdrawable shaft carrying a stop engaging for the moment the stopping means on the slide for freeing the latter for a pulling of the slide into its outermost position.

9. A device as claimed in claim 2, wherein covering means are provided for partially covering the slots in the cover on said stationary frame.

References Cited in the file of this patent

UNITED STATES PATENTS

| | | | |
|---|---|---|---|
| 182,099 | Brice | Sept. 12, | 1876 |
| 1,439,035 | Stuart | Dec. 19, | 1922 |
| 1,878,857 | Kitroser | Sept. 20, | 1932 |
| 1,879,236 | Heymer | Sept. 27, | 1932 |
| 2,050,552 | Baker | Aug. 11, | 1936 |
| 2,249,730 | Gentry | July 22, | 1941 |
| 2,601,804 | Nineberg | July 1, | 1952 |

FOREIGN PATENTS

| | | | |
|---|---|---|---|
| 712,911 | Great Britain | Aug. 4, | 1954 |
| 748,712 | Great Britain | May 9, | 1956 |
| 220,273 | Switzerland | Oct. 16, | 1952 |